Patented Feb. 15, 1944

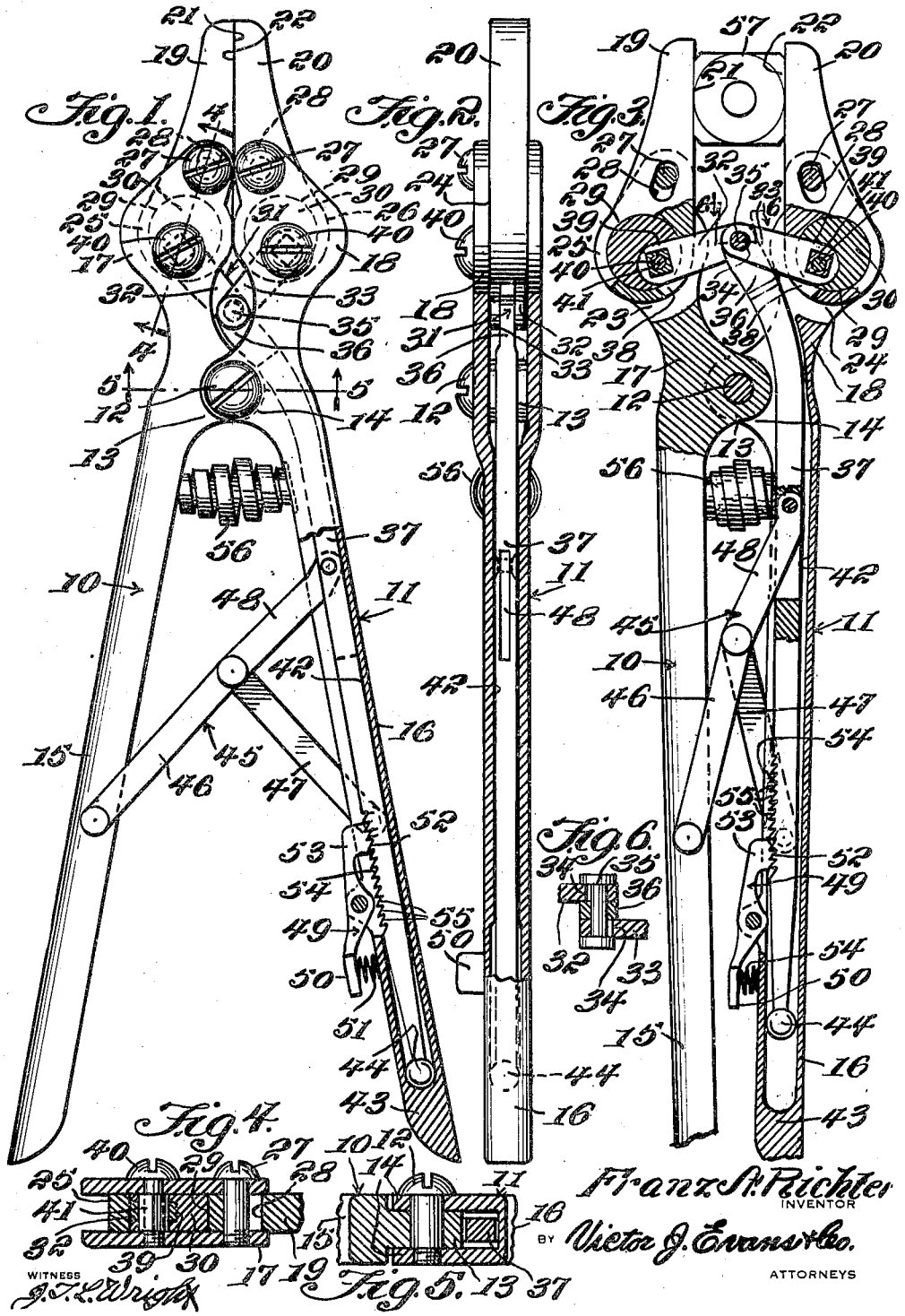

2,341,654

UNITED STATES PATENT OFFICE 2,341,654

WRENCH

Franz A. Richter, St. Louis, Mo.

Application December 26, 1941, Serial No. 424,519

6 Claims. (Cl. 81—49)

My invention relates to new and useful improvements in tools of the pliers' type.

An important object of my invention is the provision of a tool that is constructed and operates in the manner of the conventional pliers and that also possesses characteristics generally associated with wrenches in that means is provided to lock the jaws of the pliers in a selected adjusted position.

Another object of my invention is the provision of a tool of the above-mentioned character wherein the jaws are pivotally movable relative to the handles and wherein means is provided for automatically rocking the jaws about their pivot upon movement of the handles relative to each other in a manner to automatically maintain the working faces of the jaws in parallel relation at all times.

Another object of my invention is the provision of a tool of the above-mentioned character that may be easily operated by one hand of the user, the various parts comprising the tool being compactly arranged and the parts requiring manual actuation being uniquely located to be readily accessible to the user.

Yet another object of my invention is the provision of a tool of the above-mentioned character that is efficient and efficacious in the performance of its duties and that is simple in its construction to promote the inexpensive manufacture thereof.

Other objects and advantages of my invention will be apparent during the course of the following description.

In the drawing, forming a part of this specification, and wherein like numerals are employed to designate like parts throughout the same, Figure 1 is a top plan view of a device embodying my invention, parts thereof being broken away for clearness of illustration, and the jaw members thereof being shown in the closed or inoperative position, Figure 2 is an edgewise elevation of the same and similarly showing parts broken away to aid in the clear understanding of the device, Figure 3 is a top plan view of the device, parts being shown in section and parts in elevation and the jaw members thereof being illustrated in the open or operative position.

Figure 4 is a fragmentary transverse sectional view taken on the line 4—4 of Figure 1, Figure 5 is a transverse sectional view taken on the line 5—5 of Figure 1, and Figure 6 is a fragmentary transverse sectional view taken on the line 6—6 of Figure 3.

In the accompanying drawing, wherein for the purpose of illustration, is shown a preferred embodiment of my invention, the numerals 10 and 11 designate a pair of handles articulately connected to each other by the pivot 12. The handle 10 is formed intermediate its ends with a laterally extending lug 13 which fits snugly between the spaced ears or lugs 14 projecting laterally from the handle 11. The overlapping portions of the lugs 13 and 14 are formed with registering openings and the pivot pin 12 extends through the openings to hold the parts securely connected to each other. The handles are coextensive and the portions 15 and 16 thereof extending at one side of the pivot constitute handle portions adapted to be manually grasped in the hand of the user while the portions 17 and 18 extending at the opposite side of the pivot constitute supporting arms for the jaws 19 and 20.

Obviously, movement of the handle portions 15 and 16 toward each other will move the opposite ends 17 and 18 away from each other and, conversely, movement of the handle portions 15 and 16 in a direction away from each other will move the portions 17 and 18 toward each other. It will be noted, in this connection, that rocking of the handles about their mutual pivot in the above manner will increase or decrease the angle between the respective parts, that the working faces 21 and 22 of the jaws 19 and 20 will, therefore, be angularly related with each other when the jaws are spread apart and that the angle will vary directly with the angle between the supporting handle portions 17 and 18.

It is generally known that tools or wrenches of the pliers' type are most universally used to grip the opposite edges of a bolt or nut and that these edges are conventionally parallel with each other. Therefore, if the parallel edges of the nut are gripped by the angularly related faces of the plier jaws, an insecure grip is obtained on the nut. The result is a chewing or rounding of the corners of the nut and an increased tendency for the jaws to spread apart when an attempt is made to turn the nut relative to the bolt to which it is attached. It is my thought, therefore, to provide a wrench of the pliers' type that is unique in that the working faces of the jaws will at all times remain in spaced parallel relation regardless of the angle between the handles and that includes provision for automatically locking the jaws in a selected adjusted position to prevent the same from being forced apart when pressure is applied to a nut, or the like.

Attention is now directed to the jaw supporting portions 17 and 18 of the handles, which portions are formed with slots 23 and 24 in which the ends 25 and 26 of the jaws are fitted. Pivots 27 extend through registering openings in the portions 17 and 18 and through elongated slots 28 in the jaws for pivotally associating the jaws with the handles. The slots 23 and 24 extend substantially beyond the inner ends of the jaws and the inner ends of the jaws extend substantially beyond the pivots 27. The last mentioned portions of the jaws are freely movable within the slots and are provided, in substantially spaced relation with the slots 28, with circular openings 29 which rotatably receive the disks 30.

A toggle joint 31 comprising arms 32 and 33 is provided to rotate the disks within the openings 29. The inner ends of the arms are provided with elongated slots 34 which receive the pivot pin 35 and the end 36 of the actuator arm 37 is carried by the pivot pin intermediate the arms. The outer ends of the toggle joint arms extend through arcuate slots 38 in the jaws and into recesses 39 in the edges of the disks 30. As best illustrated in Figures 1 and 3, the pivot pins 40 extend through the bifurcations of the jaw supporting portions of the handles, eccentrically through the respective disks 30 and through the outer ends of the toggle joint 31. An inspection of Figure 4 will disclose the fact that the pivot pins 40 are provided with sleeves 41, which sleeves extend through the disks 30 and through the connecting ends of the toggle joint. The outer periphery of the sleeves is essentially square in cross section and the sleeves are freely rotatable about the shanks of the pivot pins. Therefore, movement of the arms of the toggle joint about their mutual pivot will angularly move the outer ends of the arms to rotate the sleeves 41, and consequently, to rotate the disks 30. By reason of the eccentric connection of the toggle joint with the disks, rotation of the disks will swing the inner ends of the jaws about the pivots 27 and the elongated slots 28 receiving the pivots will compensate for the slight longitudinal sliding movement of the jaws produced by the eccentric actuation of the inner ends thereof.

The handle members may not be actuated without expanding or contracting the toggle joint and the toggle joint may not be moved without rotating the disks 29. Therefore, the mutually coactive handles and toggle joint will effect movement of the jaws for each actuation of the handles in a manner whereby the working faces of the jaws will remain in parallel relation at all times.

While it is believed to be obvious that the jaws of the device may not be spread apart without expanding the toggle joint, I prefer that some means be provided for positively actuating the joint upon movement of the handles. I have therefore provided the actuator arm 37 hereinabove referred to. The arm extends from the knee of the toggle joint and along a channel or track 42 provided in the inner edge of the handle member 11. The outer end of the track is closed, as at 43, to prevent the distal end 44 of the arm from moving laterally out of the track but permitting the same to be freely reciprocally movable therein.

A second toggle joint 45 has the outer ends of the arms 46 and 47 thereof pivotally connected to the handle portions 15 and 16. A link 48 has one end thereof pivotally connected to the knee of the toggle joint 45 and the other end thereof pivotally connected to the actuator arm 37. Thus, as the handles are moved relative to each other, the toggle joint 45 will be expanded and contracted, and the link 48 will positively reciprocally actuate the arm 37 within its track. The toggle joint 45 provides a positive drive for the jaw actuator elements and substantially lessens the strain which would result if the spreading of the jaws alone were relied upon to expand the toggle joint 31.

A latch 49 is pivoted to the handle 16 outwardly of the connecting end of the toggle joint 45. The portion 50 extending at one side of the pivot is fashioned to constitute a fingerpiece and a coil spring 51 interposed between the handle and the fingerpiece acts to hold the serratures in the opposite end 53 thereof in interlocking engagement with the serratures 54 provided in the confronting edge of the arm 37. The angular edges 55 of the serratures are inclined in the direction of the jaw supporting ends of the handles whereby the arm 37 may ratchet freely in the direction of the jaws but whereby movement of the arm in the opposite direction will be positively prevented.

The coil spring 56 interposed between the handle portions 15 and 16 will normally hold the same spread apart to position the working faces 21 and 22 of the jaws in mutually pressed relation, as illustrated in Figure 1. Under these conditions, the toggle joint 31 will be contracted and the toggle joint 45 will be expanded. The contraction of the toggle joint 31 will move the end 44 of the actuator arm into the end of the track 42 and position the end 53 of the latch 49 at one end of the serratures 54.

Let us assume that it is desired to bring the working faces of the jaws into operative association with a nut 57. The user grasps the handle portions 15 and 16 and moves the same toward each other to spread the jaws apart. As soon as the handles are moved toward each other, the toggle joint 45 will operate through the medium of the link 48 to shift the actuator arm 37 in the direction of the jaws in a manner to positively expand the toggle joint 31. Obviously, the arm may freely ratchet in this direction relative to the latch 49. Expanding of the toggle joint 31 will effect rotation of the disks 30 to swing the inner ends of the jaws in the direction of each other and to rock the outer ends thereof in a direction away from each other whereby the working faces 21 and 22 of the jaws will be maintained in parallel relation at all times.

As soon as the jaws are spread apart a sufficient distance to accommodate the nut 57, the tool is automatically locked in this position. The coil spring 51 will hold the latch member in locked engagement with the serratures 54 in the arm to prevent retraction thereof. When the tool is moved angularly, as a unit, to rotate the nut 57, a force will be exerted against the jaws 19 and 20 which will tend to rock the same about the pivot 27. Any force pushing outwardly on the working ends of the jaws will tend to force the inner ends thereof toward each other. Obviously, the inner ends of the jaws may not move toward each other without reversely actuating the disks 30. The disks may not rotate in a reverse direction without collapsing the toggle arm 31, which toggle arm to be collapsed must shift the rod 37 in a direction away from the jaws and sliding of the arm in this manner is prevented by the latch member 49.

Thus, the jaws will be securely locked and the tool, while being constructed and operating substantially as a pliers, will also possess the essential beneficial characteristics of a wrench. When it is desired to release the object gripped between the jaws, it is only necessary to depress the fingerpiece 50 of the latch element against the resilient action of the coil spring 51 to disengage the end 53 thereof from the arm 37. It will be readily apparent that the disengagement of the latch member from the arm will permit the tensioned spring 56 to force the handle portions 15 and 16 apart and to return the pliers to the normal inoperative position illustrated in Figure 1.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In a wrench, a pair of pivoted handle members, jaws pivoted to the handles, and a toggle connection for the jaws including disks rotatably carried by the jaws at one side of their pivots, arms pivotally attached to each other and eccentrically connected to the disks, and an actuator member connected with the handles for reciprocating movement longitudinally thereof and having connection with the pivotally attached arms operable upon pivoted movement of the handles relative to each other for rocking the arms about their mutual pivot whereby to rock the jaws about their pivots through the medium of the said eccentric disks.

2. In a wrench, a pair of pivoted handles, jaws pivotally connected to the said handles, a disk rotatably carried by each of the jaws at one side of its pivot, a toggle joint eccentrically connected to each of the disks, and an actuator member connected to the handles for reciprocating movement longitudinally thereof and having connection with the knee of the toggle joint so as to actuate the jaws during pivoted movement of the handles.

3. In a wrench, a pair of pivoted handles, jaws pivotally connected to the said handles, a disk rotatably carried by each of the jaws at one side of its pivot, a toggle joint eccentrically connected to each of the disks, an actuator arm pivotally connected to the knee of the toggle joint, a second toggle joint connecting the said handles, and a link connecting the actuator arm with the handle connecting toggle joint adapted to effect reciprocation of the actuator arm upon pivoted movement of the handles.

4. In a wrench, a pair of pivoted handles, jaws pivotally connected to the said handles, a disk rotatably carried by each of the jaws at one side of its pivot, a toggle joint eccentrically connected to each of the disks, an actuator arm pivotally connected to the knee of the toggle joint, a second toggle joint pivotally connected to intermediate portions of the handles, and a link connecting the said actuator arm with the handle connecting toggle joint so as to reciprocate the arm longitudinally of the handles to actuate the jaws upon movement of the handles relative to each other, and means for locking the said actuator arm in any selected adjusted position.

5. In a wrench, a pair of pivoted handles, jaws pivotally connected to the said handles, a disk rotatably carried by each of the jaws at one side of its pivot, a toggle joint eccentrically connected to each of the disks, an actuator arm pivotally connected to the knee of the toggle joint, pivoted link mechanism connecting the said handles, a link connecting the said link mechanism with the actuator arm for sliding the arm longitudinally of the handles during pivoted movement of the latter, the said actuator arm having ratchet teeth thereon, and a spring pressed latch member carried by one of the handles and engageable with the ratchet teeth on the arm for automatically restraining movement of the arm in one direction.

6. In a wrench, a pair of pivoted handles, a jaw member pivotally mounted on each of the said handles, an eccentric rotatably carried by each of the jaw members at one side of its pivot, a toggle joint having its opposite ends fixedly connected to a respective one of the said eccentrics, a serrated actuator bar pivoted to the knee of the toggle joint and extending along one side of one of the said handles, link mechanism having pivoted connection with the said handles and with the actuator bar so as to impart reciprocating movement to the bar upon pivoted movement of the handles, and a spring pressed latch member mounted on the actuator bar carrying handle disposed to engage the serrations on the actuator bar so as to preclude longitudinal movement of the actuator when the handles move apart.

FRANZ A. RICHTER.